United States Patent
Hervieu et al.

(10) Patent No.: US 10,830,925 B2
(45) Date of Patent: Nov. 10, 2020

(54) METHOD FOR REDUCING OR PREVENTING THE DEGRADATION OF AN ANTIFOULING LAYER OR AN OPTICAL ARTICLE

(71) Applicant: ESSILOR INTERNATIONAL (COMPAGNIE GENERALE D'OPTIQUE), Charenton-le-Pont (FR)

(72) Inventors: Grégory Hervieu, Bangkok (TH); Christophe Valenti, Charenton-le-Pont (FR); Pierre-Jean Calba, Charenton-le-Pont (FR); Nicolas Maitre, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 104 days.

(21) Appl. No.: 15/501,605

(22) PCT Filed: Aug. 4, 2015

(86) PCT No.: PCT/FR2015/052153
§ 371 (c)(1),
(2) Date: Feb. 3, 2017

(87) PCT Pub. No.: WO2016/020619
PCT Pub. Date: Feb. 11, 2016

(65) Prior Publication Data
US 2017/0227683 A1 Aug. 10, 2017

(30) Foreign Application Priority Data

Aug. 5, 2014 (FR) ...................................... 14 57608

(51) Int. Cl.
*G02B 1/18* (2015.01)
*G02B 1/04* (2006.01)
(Continued)

(52) U.S. Cl.
CPC .............. *G02B 1/18* (2015.01); *B24B 13/005* (2013.01); *B29D 11/00865* (2013.01);
(Continued)

(58) Field of Classification Search
CPC ..... G02B 1/18; G02B 1/041; B29D 11/00865
See application file for complete search history.

(56) References Cited

U.S. PATENT DOCUMENTS 5,081,192 A 1/1992 Tatemoto
5,763,061 A 6/1998 Ochiai et al.
(Continued)

FOREIGN PATENT DOCUMENTS

EP 0614957 9/1994
EP 0933377 8/1999
(Continued)

OTHER PUBLICATIONS

Owens et al., "Estimation of the Surface Force Energy of Polymers", J. Appl. Polym. Sci., 13, 1969, pp. 1741-1747.

*Primary Examiner* — Elizabeth A Burkhart
(74) *Attorney, Agent, or Firm* — Norton Rose Fulbright US LLP (57) ABSTRACT

The invention concerns a method for producing an optical article suitable for edging comprising an antifouling layer on which there is deposited a temporary overlayer for assisting with edging, comprising:
depositing, on an optical substrate, an organic antifouling layer comprising at least a fluorinated polymer compound comprising hydrolysable functions; and
depositing, on the antifouling layer, an overlayer for assisting with edging, of mineral nature, comprising one or more metal fluorides and/or one or more metal oxides or hydroxides;
method characterised in that it further comprises a step of accelerated grafting of the antifouling layer chosen from:

(Continued)

Evaluation of the receding angle during the durability test (a) a treatment of the deposited antifouling layer in a humid atmosphere of the deposited antifouling layer and
(b) a catalytic treatment in the acidic or basic vapour phase of the deposited antifouling layer.

14 Claims, 3 Drawing Sheets

(51) Int. Cl.
| | |
|---|---|
| B29D 11/00 | (2006.01) |
| G02B 1/10 | (2015.01) |
| B24B 13/005 | (2006.01) |
| C03C 17/34 | (2006.01) |
| C03C 17/42 | (2006.01) |

(52) U.S. Cl.
CPC .... *B29D 11/00932* (2013.01); *C03C 17/3452* (2013.01); *C03C 17/42* (2013.01); *G02B 1/041* (2013.01); *G02B 1/10* (2013.01); *C03C 2217/213* (2013.01); *C03C 2217/22* (2013.01); *C03C 2217/251* (2013.01); *C03C 2217/28* (2013.01); *C03C 2217/285* (2013.01)

(56) References Cited

U.S. PATENT DOCUMENTS

| | | | |
|---|---|---|---|
| 5,922,787 A | 7/1999 | Kondo et al. | |
| 6,183,872 B1 | 2/2001 | Tanaka et al. | |
| 6,277,485 B1* | 8/2001 | Invie | C09D 4/00 |
| | | | 106/287.13 |
| 6,337,235 B1 | 1/2002 | Muyanaga et al. | |
| 2003/0049370 A1* | 3/2003 | Lacan | C03C 17/00 |
| | | | 427/165 |
| 2009/0232978 A1* | 9/2009 | Suzuki | G02B 27/0006 |
| | | | 427/162 |
| 2012/0019767 A1* | 1/2012 | Cadet | C03C 17/30 |
| | | | 351/62 |
| 2012/0237777 A1* | 9/2012 | Lu | B05D 5/083 |
| | | | 428/421 |

FOREIGN PATENT DOCUMENTS

| | | |
|---|---|---|
| EP | 1392613 | 8/2005 |
| EP | 1633684 | 1/2014 |
| JP | 2005187936 | 7/2005 |
| WO | WO2008/062142 | 5/2008 |
| WO | WO2011/060047 | 5/2011 |

* cited by examiner

HDTC 17nm - Change in the receding angle during the durability test

Fig.4

Evaluation of the receding angle during the durability test

Fig. 5

METHOD FOR REDUCING OR PREVENTING THE DEGRADATION OF AN ANTIFOULING LAYER OR AN OPTICAL ARTICLE

CROSS-REFERENCE TO RELATED APPLICATIONS

This application is a national phase application under 35 U.S.C. § 371 of International Application No. PCT/FR2015/052153 filed 4 Aug. 2015, which claims priority to French Patent Application No. 1457608 filed 5 Aug. 2014. The entire contents of each of the above-referenced disclosures is specifically incorporated by reference herein without disclaimer.

The present invention relates generally to a process for reducing or preventing the degradation of an antifouling layer of an optical article, in particular of an ophthalmic lens, due to the deposition on this antifouling layer of a top coat that facilitates edging.

As is well known in the art, an ophthalmic lens results from a succession of molding, surfacing and smoothing steps that determine the geometry of the convex and concave optical surfaces of the lens, followed by appropriate surface treatments.

The last finishing step of an ophthalmic lens is an edging operation that consists in machining the periphery or edge face of the lens in order to adapt it to the dimensions and shape required for the fitting thereof in a given frame.

As is also well known, this edging operation is carried out using a grinding machine comprising diamond wheels.

During the edging operation, the lens is held by axial blocking elements, the lens being fastened to one of the blocking elements by adhesion, in particular by means of an adhesive pad. Good holding of the lens during this edging operation therefore depends essentially on the good adhesion of the surface of the lens with the blocking element.

As is, furthermore, also well known, in general the last functional layer formed on the convex surface of the lens, surface intended to be fastened by adhesion, using a pad, to the blocking element during an edging operation, is an antifouling layer of low surface energy.

These antifouling layers, typically formed of fluorosilane-based materials, have achieved such a degree of performance, in particular such low surface energy values, that it would no longer be possible to fasten, by adhesion, the lenses coated with such antifouling layers to the adhesive pad of the blocking element for the edging thereof.

In order to resolve this difficulty, it has been proposed to coat the antifouling layer of the lens with a temporary top coat that increases the surface energy of the surface of the lens and thus enables the fastening using an adhesive pad to the blocking element for risk-free edging of the lens. This temporary top coat that facilitates edging, typically a metal fluoride and/or oxide layer, is easily removed, in particular by simple wiping, once the edging is carried out, while retaining an efficient. antifouling layer.

Such a solution is described, inter alia, in patents EP 1 392 613 and EP 1 633 684.

Although the above solutions were satisfactory, the inventors determined that, when the temporary top coat that facilitates edging was deposited rapidly after the deposition of the antifouling layer, that is to say within a period of 15 days after the deposition of this antifouling layer, a considerable degradation of the properties of the antifouling layer appeared after removal of the top coat that facilitates edging. In particular, the receding angle of a liquid such as water on the antifouling layer, as measured according to the method described below on test lenses, that have or have not been subjected to a durability test, is significantly reduced relative to an antifouling layer formed under identical conditions but on which no top coat that facilitates edging has been deposited.

Tests have shown that the degradation of the antifouling layer is even greater when the top coat that facilitates edging is deposited rapidly after the deposition of the antifouling layer without decompression. The inventors have also observed that the degradation of the antifouling layer increased with the duration of the presence of the top coat that facilitates edging on the antifouling layer before the removal thereof.

However, to facilitate the industrial manufacture, especially of ophthalmic lenses, and to reduce the costs of this manufacture, it would be desirable to have a process that enables a deposition of the top coat that facilitates edging as rapidly as possible after the formation of the antifouling layer. Similarly, it would be desirable, once the top coat that facilitates edging is deposited, to be able to store the lenses for a long time, without degradation of the antifouling layer, before removal of the top coat, for an optimal adaptation to the application.

The objectives below are achieved according to the present invention using a process for manufacturing an optical article fit for edging, comprising an antifouling layer on which is deposited a temporary top coat that facilitates edging, comprising:

the deposition, on an optical substrate, of an organic antifouling layer comprising at least one fluoropolymer compound comprising hydrolysable functions; and the deposition, on the antifouling layer, of a top coat that facilitates edging, of mineral nature, comprising one or more metal fluorides and/or one or more metal oxides or hydroxides;

process characterized in that it additionally comprises, in order to reduce or prevent the degradation of the antifouling layer owing to the temporary presence of the top coat that facilitates edging, prior to the deposition of the top coat that facilitates edging, a step of accelerated grafting of the antifouling layer selected from:

(a) a treatment of the antifouling layer deposited in a wet atmosphere, preferably in an air atmosphere at atmospheric pressure, having a degree of relative humidity (RH) of from 45% to 95% and a temperature of from 15° C. to 75° C., preferably for a duration of 1 to 15 days; or (b) a catalytic treatment in acidic or basic vapor phase of the deposited antifouling layer.

The remainder of the description refers to the appended figures which represent, respectively.

The optical article according to the invention, preferably an ophthalmic lens, comprises a substrate made of glass, preferably made of organic glass, for example made of thermoplastic or thermosetting plastic material. The substrate may be chosen from the substrates mentioned in application WO 2008/062142, for example a substrate obtained by (co)polymerization of diethylene glycol bis (alkyl carbonate), a poly(thio)methane substrate or a substrate made of polycarbonate (PC).

As is well known, the substrate may, before the deposition of the antifouling layer, be coated with one or more functional coatings such as an impact-resistant primer coating, a scratch-resistant and/or abrasion-resistant coating and an antireflection coating.

Other functional layers, such as an antistatic coating, a polarizing coating or a photochromic coating may be present before the deposition of the antifouling layer.

The materials used to form the antifouling layers of the present invention are well known in the art and are defined as hydrophobic and/or oleophobic coatings, the static contact angle of which with deionized water is greater than or equal to 75°, preferably greater than or equal to 90° and better still greater than or equal to 100°. The static contact angle may be determined using the liquid droplet method, in which a liquid droplet having a diameter smaller than 2 mm is deposited gently on a solid non-absorbent surface and the angle at the interface between the liquid and the solid surface is measured.

The antifouling layer according to the invention is an organic coating, comprising at least one fluoropolymer compound comprising hydrolysable functions capable of reacting chemically with the substrate in order to be grafted thereto. Preferably, the fluoropolymer compound is a polymer compound of silane and/or silazane nature that may participate in hydrolysis and condensation reactions and bear one or more fluorinated groups, in particular fluorinated or even perfluorinated hydrocarbon groups. These polymer compounds are also known as fluorosilanes and fluorosilazanes. Preferably, the hydrolysable functions are alkoxysilane functions (—Si(OR)$_n$ in which n is an integer from 1 to 3 and —R is a $C_1$-$C_4$ alkyl group, preferably a —CH$_3$ or —C$_2$H$_5$ group). More preferably, the hydrolysable functions are present at only one end of the chain of the polymer compound.

It may be obtained by deposition of a fluorosilane or fluorosilazane precursor, preferably comprising at least two hydrolysable groups per molecule. The fluorosilane precursors preferably contain fluoropolyether groups and better still perfluoropolyether groups. These fluorosilanes are well known and are described, inter alia, in U.S. Pat. Nos. 5,081,192, 5,763,061, 6,183,872, 5,922,787, 6,337,235, 6,277,485 and EP 0 933 377. Such compounds are capable of undergoing, when they are deposited on a surface, grafting reactions with the substrate, directly or after hydrolysis.

Preferably, the external antifouling coating has a surface energy less than or equal to 14 mJ/m$^2$, preferably less than or equal to 13 mJ/m$^2$, better still less than or equal to 12 mJ/m$^2$. The surface energy is calculated using the Owens-Wendt method described in the article: "Estimation of the surface force energy of polymers", Owens D. K. and Wendt R. G. (1969), J. Appl. Polym. Sci., 13, 1741-1747.

Compounds that can be used to obtain such antifouling coatings are described in patents JP 2005/187936 and U.S. Pat. No. 6,183,872.

Particular preferred fluoropolymer compounds are those corresponding to the formula (C) below:

$$F—(CF_2)_q—(OC_3F_6)_m—(OC_2F_4)_n—(OCF_2)_o(CH_2)_p— \\ X(CH_2)_r—(CH_2)_t—Si(X')_{3-a}(R1)_a \quad (C)$$

in which q is an integer from 1 to 3; m, n and o are, independently, integers from 0 to 200; p is 1 or 2; X is 0 or a divalent organic group; r is an integer from 2 to 20; t is an integer from 1 to 10, R1 is a linear or branched $C_1$-$C_{22}$ hydrocarbon group; a is an integer from 0 to 2; and X' is a hydrolysable group, an —OH group or an —NH$_2$ group.

Typically, the hydrolysable groups are chlorine, —OR alkoxy and —NHR or —NR$_2$ alkylamino groups in which R is a $C_1$-$C_{22}$ alkyl radical. The preferred materials are materials comprising a compound corresponding to formula (C) above for which X' is an alkylamino.

Such products are described in international patent application WO 2011/060047.

Commercial compositions that make it possible to prepare antifouling coatings are the compositions KY130® (corresponding to the formula in patent JP 2005/187936) and KP 801M® sold by Shin-Etsu Chemical, and the composition OPTOOL DSX® (a fluorinated resin comprising perfluoropropylene groups corresponding to the formula in U.S. Pat. No. 6,183,872) sold by Daikin Industries. The composition OPTOOL DSX® is a preferred antifouling coating composition.

One particularly preferred product is the product (YY) described in example 4 of WO 2011/060047, and denoted herein after by HDTC.

Typically, the antifouling layer has a physical thickness of from 1 nm to 30 nm, preferably from 1 nm to 25 nm, better still from 1 to 20 nm, even better still from 1 to 10 nm and ideally from 1 to 5 nm. In general, the thickness of the antifouling layer is from 3 to 20 nm, preferably from 3 to 8 nm.

The processes for depositing these antifouling layers are also well known and described, inter alia, in the aforementioned documents.

Similarly, the top coats that facilitate edging that are of mineral nature and also their processes are well known in the art and are described in particular in patents EP 1 392 613 and EP 1 633 684.

As indicated, the top coats that facilitate edging are of mineral nature and more particularly consist of one or more metal fluorides such as magnesium fluoride (MgF$_2$), lanthanum fluoride (LaF$_3$), aluminum fluoride (AlF$_3$) and cerium fluoride (CeF$_3$), one or more metal oxides and/or hydroxides such as magnesium oxide (MgO), magnesium hydroxide (Mg(OH)$_2$), and oxides of titanium, aluminum, zirconium and praseodymium, and also mixtures of these fluorides and these oxides.

Preferably, the temporary top coat that facilitates edging consists of a layer of metal fluoride, in particular of MgF$_2$, and optionally of a layer of oxide or hydroxide, in particular of MgO or Mg(OH)$_2$, as described in patent EP 1 633 684.

Industrially, it is desirable to be able to successively carry out the operations of deposition of the antifouling coating and of the top coat that facilitates edging on the optical article, in particular an ophthalmic lens, in the shortest possible time and to be able to store the articles obtained for a relatively long period before the edging thereof to a given shape, in particular of a spectacles frame in the case of ophthalmic lenses, for a final use after elimination of the temporary top coat that facilitates edging.

However, the inventors have demonstrated that a deposition of the temporary top coat immediately or slightly after the deposition of the antifouling layer and also prolonged storage of the article obtained after the depositions before the removal of the temporary top coat led to a degradation of the properties of the antifouling layer, in particular a reduction in the receding angle.

As indicated previously, the above defects may be overcome according to the invention by subjecting the antifouling layer, following its deposition and before the deposition of the top coat that facilitates edging, to a step of accelerated grafting that consists either of a treatment in a wet air atmosphere, or of a catalytic treatment in an acidic or basic phase.

The treatment in an air atmosphere consists in placing the article provided with the antifouling layer in air at atmospheric pressure having a degree of relative humidity (RH) of from 45% to 95% and a temperature of from 15° C. to 75° C., preferably for a duration of 1 to 15 days.

Ambient conditions denote an air atmosphere at atmospheric pressure having a RH of from 45% to less than 65%, preferably from 50% to less than 65% and a temperature of from 18° C. to less than 35° C., preferably from 20° C. to less than 35° C.

Tropical conditions denote an air atmosphere at atmospheric pressure having a RH of from 65% to 95% and a temperature of from 35° C. to 75° C.

Use is preferably made of an air atmosphere having a RH of from 50% to 95%, better still from 50% to 90% and a temperature of from 25° C. to 75° C., better still from 25° C. to 50° C.

More preferably, the degree of relative humidity is from 70% to 90% and the temperature is from 35° C. to 50° C.

Preferably, the treatment time is from 1 to 7 days, better still from 2 to 5 days.

This treatment in an air atmosphere may be carried out directly in the chamber that was used for the deposition of the antifouling layer, following this deposition. Thus, the depositions of the antifouling layer and of the top coat that facilitates edging are carried out under vacuum and the step of accelerated grafting of the antifouling layer is a treatment in a wet atmosphere of the antifouling layer carried out by a step of returning to an air atmosphere at atmospheric pressure between the deposition of the antifouling layer and the deposition of the top coat that facilitates edging.

In one particular embodiment, the depositions of the antifouling layer and of the top coat that facilitates edging are carried out under vacuum in a vacuum chamber and the step of accelerated grafting of the antifouling layer is a treatment in a wet atmosphere of the antifouling layer carried out by release of water into the vacuum chamber, without a step of returning to atmospheric pressure between the deposition of the antifouling layer and the deposition of the top coat that facilitates edging.

Preferentially, the water is released into the vacuum chamber by deicing of a "Meissner", this step now being described in greater detail.

The Meissner is a cryogenic trap located inside the vacuum chamber. Typically, it consists of a long coil-shaped copper tube in which a cryogenic fluid circulates. At the start of a secondary pumping step, the Meissner is activated (step of "icing" of the Meissner): the fluid travelling through it is then placed at a temperature below −100° C. The water molecules are then trapped in the form of ice on the wall of the tube, which leads to a drop in the residual pressure inside the chamber.

When the Meissner is deiced (step of "deicing" of the Meissner): the fluid travelling through it is placed at a temperature close to 25° C. The water molecules are then vaporized and released into the chamber, making it possible to carry out the step of accelerated grafting of the antifouling layer of the present invention.

In another embodiment, the grafting step is accelerated by additionally imposing an increase in temperature.

In this case, the temperature at which the process of the invention is carried out is preferably above 60° C., better still above 70° C., even better still above 80° C.

The catalytic treatment consists in placing the article provided with the antifouling layer in an acidic or basic atmosphere, for example a vapor phase containing hydrochloric acid (HCl) or ammonia ($NH_3$). It is possible to use air saturated with HCl or $NH_3$ with its liquid phase in aqueous solution at atmospheric pressure and ambient temperature (18-35° C.), preferably 18-25° C., in particular a 37 wt % saturated HCl aqueous solution.

The optimal properties of the antifouling layer, in the absence of a top coat, are obtained after complete grafting of the layer. It may be considered that a complete grafting is obtained when the surface layer is homogeneous, which is expressed by a receding angle that remains maximum even after rinsing of the surface with a fluorinated solvent, the objective of which is to eliminate the non-grafted molecules.

The time until the complete grafting depends on the nature of the antifouling layer, but is generally around one week or more. However, even by depositing, without use of an accelerated grafting treatment, the top coat that facilitates edging on the antifouling layer after this grafting period, a degradation of the properties of the antifouling layer is observed.

Surprisingly, the accelerated grafting treatment according to the invention makes it possible to practically retain the properties of the antifouling layer, in particular the value of the receding angle.

The invention is illustrated in a nonlimiting way by the following examples.

EXAMPLES

1. General Procedures 1.1. Substrates

The substrates used are ESSILOR ORMA® lens substrates having a diameter of 65 nm, a power of −2.00 diopters and a thickness at the centre of 1.2 mm.

The concave face of the substrates is coated i) with an impact-resistant primer coating based on a polyurethane latex containing polyester units, cured at 90° C. for 1 hour (Witcobond® 234 from BAXENDEN CHEMICALS, spin coating at 1500 rpm for 10 to 15 seconds); ii) with the abrasion-resistant and scratch-resistant coating (hard coat) disclosed in example 3 of patent EP 0 614 957 (having a refractive index equal to 1.50), based on a hydrolysate of an epoxy trialkoxysilane (γ-glycidoxypropyltrimethoxysilane, GLYMO) and of a dialkyldialkoxysilane (dimethyldiethoxysilane, DMDES), colloidal silica and aluminum acetylacetonate; and iii) with an antireflection coating.

Said abrasion-resistant and scratch-resistant coating was obtained by deposition and curing of a composition comprising, by weight, 224 parts of GLYMO, 80.5 parts of 0.1 N HCl, 120 parts of DMDES, 718 parts of 30% colloidal silica in methanol, 15 parts aluminum acetylacetonate (curing catalyst) and 44 parts of ethyl cellosolve. The composition also comprises 0.1% of FLUORAD™ FC-430® surfactant from 3M, by weight relative to the total weight of the composition.

The layers of the antireflection coating were deposited, without heating the substrates, by vacuum evaporation optionally, when specified, assisted during the deposition by a beam of oxygen ions (evaporation source: electron gun).

The antireflection coating is a stack:

|  | Material | Optical thickness (nm) |
| --- | --- | --- |
| First layer | $ZrO_2$ | 55 |
| Second layer | $SiO_2$ | 30 |
| Third layer | $ZrO_2$ | 160 |
| Fourth layer | $SiO_2$ | 120 |

The optical thicknesses are given for $\lambda=550$ nm.

1.2. Antifouling Layer

The material used is either HDTC, or OPTOOL DSX® from DAIKIN.

The deposition of the antifouling layers is carried out directly on the antireflection coating by vacuum deposition using a vacuum treatment (VT) machine of SYRUS model, with programmed thicknesses of 17 nm or 19 nm, except the fifth series of glasses (SATIS 1200 DLF vacuum treatment machine).

Measurement of the Thicknesses of the Deposited Layers.

The values of the thicknesses programmed into the evaporation device were different to those actually deposited. Therefore, the evaporation conditions that needed to be applied to deposit the physical thicknesses required for the hydrophobic monolayers, the metal fluoride monolayers and the metalloid or metal hydroxide or oxide monolayers were determined.

The thicknesses were measured using an ellipsometer.

Technique Using a Woollam VB-400 VASE Spectro-Ellipsometer

The technique is described for a hydrophobic layer, but applies to any layer of small thickness and preferably of thickness smaller than or equal to 25-30 nm and better still ($<\approx$10-15 nm). The hydrophobic monolayer was deposited on a monocrystalline silicon substrate that had undergone an ion pre-cleaning (IPC) treatment (60 seconds 1 A −100V).

The thickness deposited on the silicon discs was measured.

The index of the hydrophobic layers was about 1.36.

The layers were assumed to have been deposited on a native $SiO_2$ oxide of 2 nm and a Cauchy model was used for the refractive index of the layer: $n=a+b/\lambda+c/\lambda^2$ for a wavelength $\lambda$. Typically, $a=1.36$; $b=0.003$ and $c=0$ for the hydrophobic fluorinated layers. The method then consisted in measuring $\psi$ and $\Delta$ at an incidence of 75° between 300 and 800 nm and in computationally adjusting the values (angle of incidence and thickness of the layer) to obtain a good fit (the best superposition of the curves) between the theoretical simulation and the actual measurement of the sample using $\tan(\psi)$ and $\cos(\Delta)$. The thickness measurement was confirmed if the value of the angle obtained during the adjustment was close to 75° (75°+/−0.5°).

To use this method to measure the thickness of other layers, and in particular of the MgO layer, the value of a must be replaced with the value (known in the art) corresponding to the material in question.

For the thicker layers, in particular an $MgF_2$ layer, a conventional thickness measurement was carried out using the Woolam VB-400 VASE ellipsometer (measurement at 3 angles of incidence: 65°, 70° and 75°).

The adjustment was carried out by varying the Cauchy parameters and the thickness. The starting point for the calculation was a (dependent on the material), $b=0.003$ and $c=0$ and an estimated value of the thickness (typically $a=1.38$ for $MgF_2$).

1.3. Top Coat that Facilitates Edging

The topcoat consists of an $MgF_2$ layer and an MgO layer deposited by evaporation using the same machine as the antifouling layer.

a) Deposition of the $MgF_2$ Layer

The evaporating material was a compound of formula $MgF_2$, of 1-2.5 nm grain size, sold by MERCK. For the $MgF_2$, the deposition rate was adjusted to about 0.75 nm/s.

b) Deposition of the MgO Layer

MgO having a thickness equal to 2 nm was then deposited by evaporation directly on the $MgF_2$ layer, using MgO pellets (reference 0481263) from UMICORE.

2. Tests 2.1. Measurement of the Receding Angle

The receding angle is defined in the doctoral thesis—Université Paris 7—Denis Diderot, presented by Nolwenn Le Grand-Piteira and defended at ESCPI on Jun. 21, 2006, in particular Chapter 1, pages 19-20, paragraph 1.3.4 "Une loi insuffisante dans la réalité—Hystérésis du mouillage" [A law that is inadequate in reality—Hysteresis of wetting].

The measurements were carried out using a KRUSS-DSA100 image acquisition and analysis semiautomatic goniometer equipped with the tilting table option (PA3220). The measurements are carried out at the geometric center of the concave face of spherical lenses with a radius of curvature >100 mm.

Figure 5:
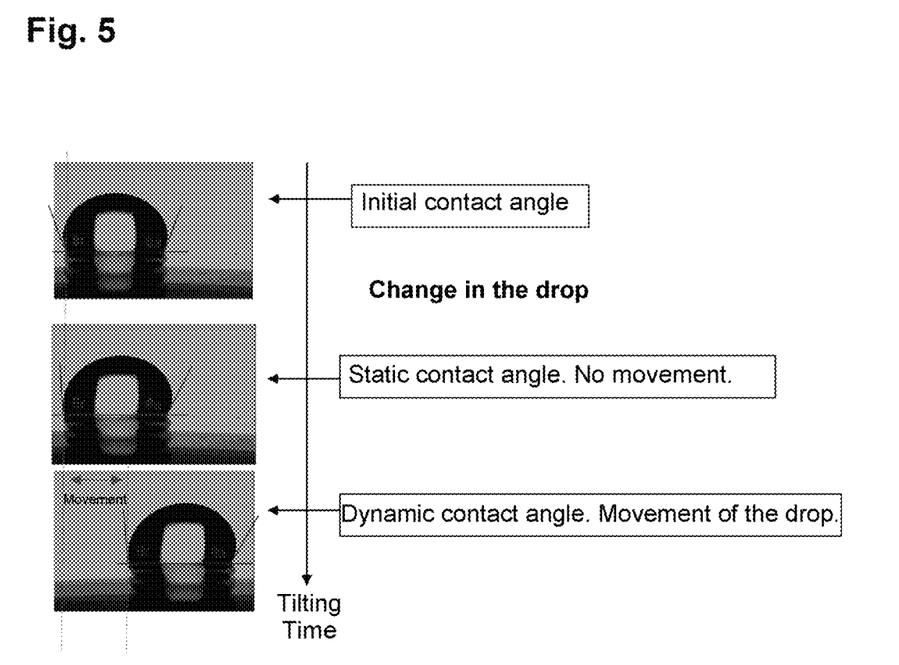
FIG. 5, a diagram of the hysteresis of a drop during the measurement of the receding angle.

The measurement takes place in three steps:
application of a drop of deionized water with a volume of 25 µl at the geometric center;
automatic tilting of the table at constant speed (3°/second) and continuous acquisition of the image of the moving drop;
analysis of images resulting from the acquisition sequence with determination of the speed of movement of the drop and of the contact angles at the triple points at the front θa and at the rear of the drop θr (see FIG. 5). It is the contact angle formed between the tangent to the drop at the triple point (liquid/water/solid junction) and the tangent to the surface of the lens at the same triple point, the drop being examined in profile. By convention, the angle is that located within the drop.

The receding angle θr corresponds to the angle determined at the opposite point in the direction of movement of the drop.

The value of the receding angle considered in our tests is the average of the values of angles for which the speed of movement of the drop is between 0.05 and 0.1 mm/second.

2.2. Durability Test

This test consists in characterizing the durability of the antifouling layers of the optical articles by an evaluation of the performances of the optical articles after accelerated aging (mechanical stress) cycles using the measurement of the receding angle.

Description of the Test

1. Removal of the Top Coat

At the time $t_\emptyset$, the top coat that facilitates edging is removed and the receding angle of the surface is measured.

2. Aging Sequence

A 30×40 M840S microfiber fabric from FACOL is immersed in water at 25° C. for 1 minute then placed back in air. This microfiber fabric is then used to mechanically rub the surface of the optical article comprising the (hydrophobic) antifouling coating 1200 times (i.e. 600 cycles), 2400 times (i.e. 1200 cycles), 3600 times (i.e. 1800 cycles), 4800 times (i.e. 2400 cycles) in a back-and-forth movement (one cycle corresponding to one forward movement and one return movement) while applying a load of 3.5 kg (in air at 25° C., 40 to 60% humidity). The receding angle is measured after 2400 rubbing cycles. The mechanical rubbing equipment is adjusted to achieve 600 cycles in 7 minutes.

3. Measurement of the Receding Angles (After Durability Test)

In the tests described, the receding angles have been presented by comparing the value thereof before and after aging.

3. Experiments 3.1. First Series of Lenses (Spectacle Lenses)

Three batches of lenses were manufactured as indicated below using the HDTC material with a programmed thickness of 17 nm.

The lenses of the first batch (batch no. 1) do not comprise a top coat that facilitates edging. The lenses of the two other batches (batches no. 2 and no. 3) were coated with a top coat following the deposition of the antifouling layer.

Before and after the durability test, the receding angle of the antifouling layer was measured after storage under ambient conditions and removal of the top coat.

| Batch no. | Storage before deposition of the top coat | | Storage before removal of the top coat | |
|---|---|---|---|---|
| | Time | Conditions | Time | Conditions |
| 1 | No top coat | | No top coat | |
| 2 | Immediate deposition of the top coat | | 1 week | ambient 25° C.-50% RH-P atm |
| 3 | Immediate deposition of the top coat | | 1 month | ambient 25° C.-50% RH-P atm |

Figure 1:
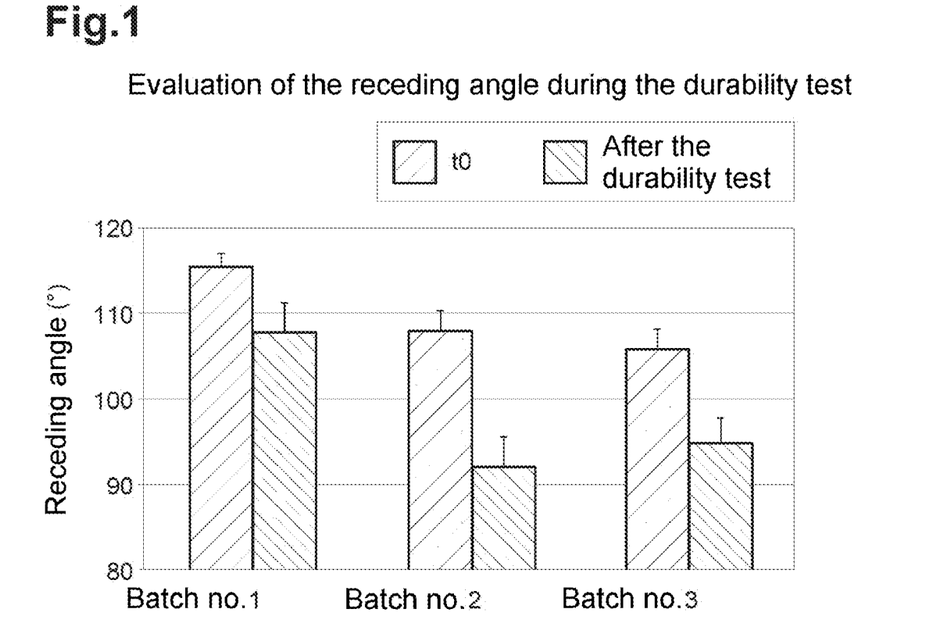
FIG. 1, graphs of the change in the receding angle of the antifouling layer after deposition and removal of a temporary top coat that facilitates edging deposited according to the prior art before and after a durability test.

The results (average of the measurement over 3 lenses) are given in FIG. 1.

A great reduction in the value of the receding angle is noted, in particular after the durability test, for the lenses from batches no. 2 and no. 3 which were coated with a top coat that facilitates edging.

3.2. Second Series of Lenses

Three batches of lenses were manufactured as indicated in the general procedures (HDTC, 17 nm).

The lenses of batch no. 4 and of batch no. 6 are analogous to those of batches no. 1 and no. 3 respectively from the first series.

The lenses of batch no. 5 were produced according to the process of the invention by storing the lenses provided with the antifouling layer under a tropical air atmosphere (40° C. and 80% RH) for one week before depositing the top coat. Then the coated lenses were stored for several days under ambient conditions before removal of the top coat.

Before and after the durability test, the receding angle of the antifouling layer was measured after storage and removal of the top coat.

| Batch no. | Storage before deposition of the top coat | | Storage before removal of the top coat | |
|---|---|---|---|---|
| | Time | Conditions | Time | Conditions |
| 4 | No top coat | | No top coat | |
| 5 | 1 week | tropical (40° C. and 80% RH) | 1 week | ambient |
| 6 | Immediate deposition of the top coat | | 1 week | ambient |

Ambient conditions: 25° C.-50% RH—atmospheric pressure

Tropical conditions: 40° C.-80% RH—atmospheric pressure

Figure 2:
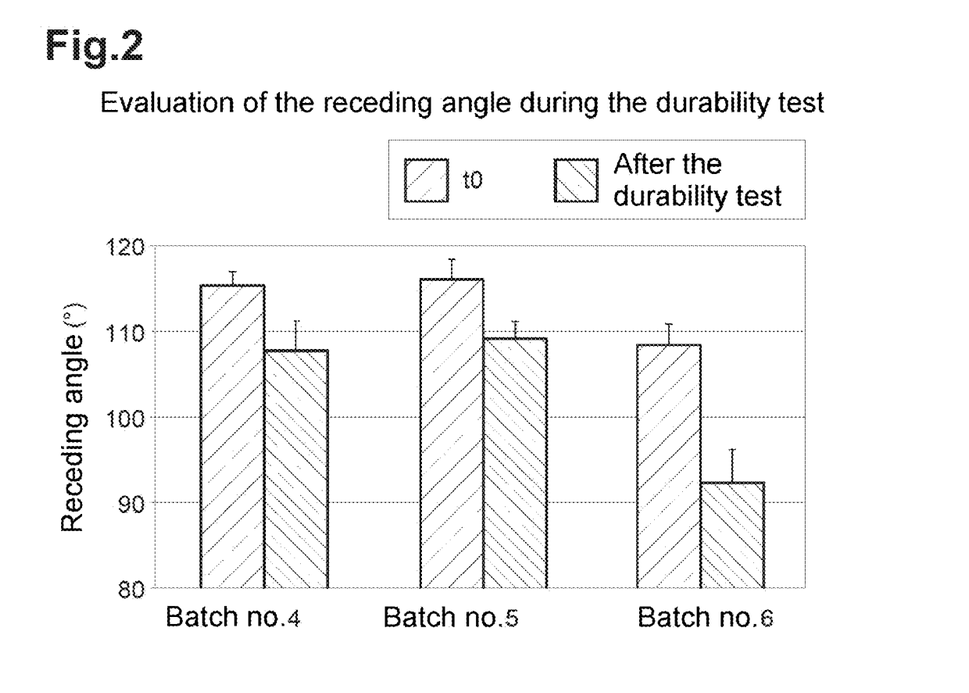
FIG. 2, graphs of the change in the receding angle of the antifouling layer after deposition and removal of a temporary top coat that facilitates edging deposited according to an embodiment of the process of the invention and the process of the prior art, before and after a durability test.

The results (average of the measurement over three lenses) are given in FIG. 2.

The results show that the lenses treated according to the invention (batch no. 5) have receding angle values, in particular after a durability test, at least equivalent to those of a lens that has not been coated with a top coat that facilitates edging (batch no. 4) and much higher than those of the lenses not treated according to the invention (batch no. 6), of which the temporary top coat that facilitates edging is deposited immediately and with no treatment after the deposition of the antifouling layer.

3.3. Third Series of Lenses

The tests of the second series of lenses were reproduced but by varying the storage times and conditions of the lenses before and after deposition of the top coat that facilitates edging. Batch no. 6 is repeated as reference.

| Batch no. | Storage before deposition of the top coat | | Storage before removal of the top coat and measurement of the receding angle | |
|---|---|---|---|---|
| | Time | Conditions | Time | Conditions |
| 6 | Immediate deposition of the top coat | | 1 week | ambient |
| 7 | No top coat | | No top coat | |
| 8 | 2 days | ambient | <1 day | ambient |
| 9 | 5 days | ambient | 3 days | ambient |
| 10 | 2 days | tropical | 3 days | ambient |
| 11 | 2 days | ambient | 2 months | ambient |
| 12 | 7 days | ambient | 2 months | ambient |

Figure 3:
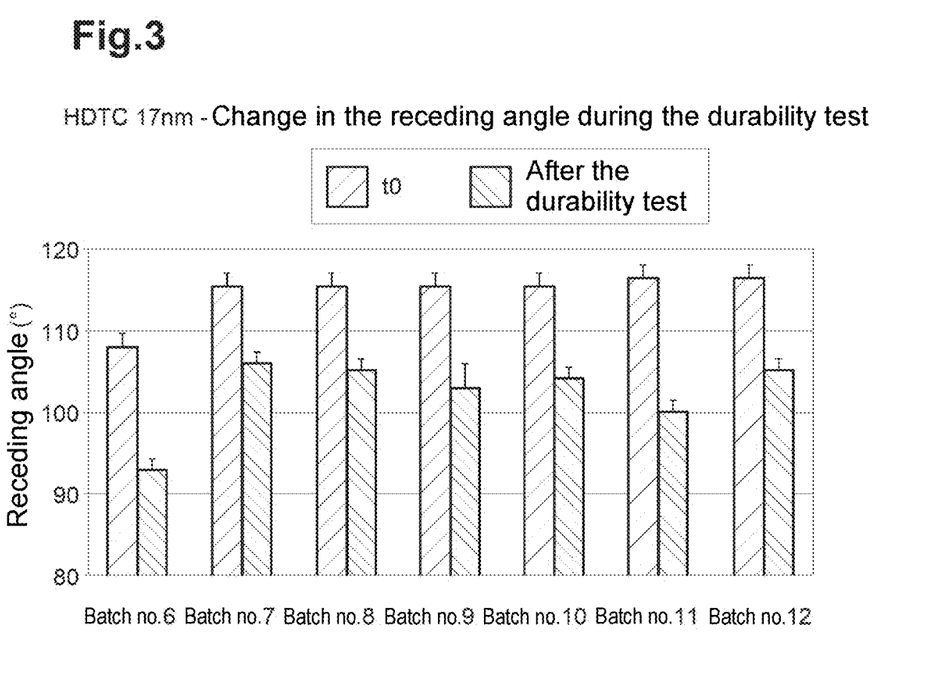
FIG. 3, graphs of the change in the receding angle of the antifouling layer after deposition and removal of the temporary top coat that facilitates edging deposited according to an embodiment of the process of the invention and the process of the prior art, before and after a durability test, for various storage times after deposition of the antifouling layer before deposition of the top coat and various times before removal of the top coat.

The results are depicted in FIG. 3.

The results show that the lenses treated according to the invention (batches no. 8 to 12) have initial ($t_o$) receding angle values equivalent to those of a lens that has not been coated with a top coat that facilitates edging (batch no. 7) and receding angle values after a durability test that are much higher than those of the lenses not treated according to the invention (batch no. 6), of which the temporary top coat that facilitates edging is deposited immediately and with no treatment after the deposition of the antifouling layer.

3.4. Fourth Series of Lenses

Three batches of lenses (batches no. 13, 14 and 15) are manufactured as indicated in the general procedures with a SYRUS 3 machine using OPTOOL DSX® and a programmed thickness of 19 nm.

The conditions are the following:

| Batch no. | Storage before deposition of the top coat | | Storage before removal of the top coat | |
|---|---|---|---|---|
| | Time | Conditions | Time | Conditions |
| 13 | 2 weeks | tropical | 1 week | ambient |
| 14 | No top coat | | No top coat | |
| 15 | Immediate deposition of the top coat | | 1 week | ambient |

Figure 4:
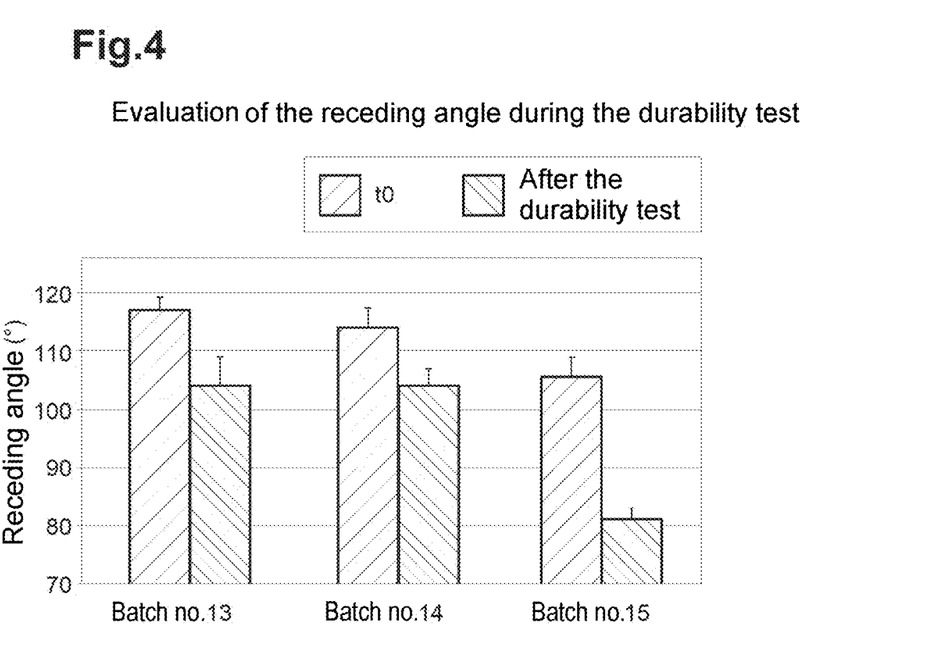
FIG. 4, graphs of the change in the receding angle before and after a durability test with the process of the invention and the process of the prior art.

The results of the receding angle measurements, before and after a durability test, are given in FIG. 4.

These results show that the process of the invention (batch no. 13) enables the antifouling layer to retain its initial properties (i.e. the properties before deposition and removal of a top coat that facilitates edging (batch no. 14)), in particular the value of the receding angle, the receding angle of the lenses treated according to the invention being at least 8° greater than that of the control lens (batch no. 15).

3.5 Fifth Series of Lenses (Example with Release of Water into the Vacuum Deposition Machine).

The vacuum device used for the deposition is a SATIS 1200 DLF machine.

The lenses are prepared according to the procedure described in 1.1 above, except that the antireflection coating is a stack consisting of a silica sublayer, a thin layer of zirconia 20 nm (Z1), a thin layer of silica ~20 nm (Q1), a thick layer of zirconia ~70 nm (Z2), a very thin layer of ITO (indium tin oxide), a thick layer of silica ~80 nm (Q2), the Optool DSX antifouling layer ~6 nm (thickness actually obtained), the $MgF_2$ (~20 nm)+1 nm MgO top coat.

In the reference (comparative) example, the deicing of the Meissner is carried out after the deposition of the MgO layer and at the start of the decompression (reference).

The example of batch no. 16 (invention) consisted, relative to the reference, in carrying out the deicing of the Meissner after the deposition of the DSX and before the deposition of the $MgF_2$.

The example (batch no. 17) (invention) consisted, relative to the example of batch no. 16, in carrying out the whole of the process at high temperature: 100° read on the heaters of the machine, metallic resistors located above the carousel.

The example of batch no. 17 (invention) enables the vaporization of the water located on the Meissner for an initiation of the hydrolysis of the DSX and accelerated grafting before the deposition of the $MgF_2$. This example combines a hydrolysis reaction with humidity and an increase in temperature.

Process Parameters.

Reference Test

Q2: Pressure before deposition $9.1^E$-4 Pa
Optool DSX: Pressure before deposition $6.9^E$-4 Pa
$MgF_2$: Pressure before deposition $6.5^E$-4 Pa
MgO: Pressure before deposition $5.9^E$-4 Pa Example Batch No. 16

Q2: Pressure before deposition $1^E$-3 Pa
Optool DSX: Pressure before deposition $7.9^E$-4 Pa
Meissner deicing and pumping before next step: Max pressure achieved $1.06^E0$ Pa/time 10 minutes
$MgF_2$: Pressure before deposition $2^E$-3 Pa
MgO: Pressure before deposition $1.7^E$-3 Pa Example Batch No. 17

Heating at 100°
Q2: Pressure before deposition $8.5^E$-3 Pa
Optool DSX: Pressure before deposition $6^E$-4 Pa
Meissner deicing and pumping before next step: Max pressure achieved $1.25^E0$ Pa/time 13 minutes
$MgF_2$: Pressure before deposition $2^E$-3 Pa
MgO: Pressure before deposition $1.8^E$-3 Pa The Results Reference (comparative) test: receding angle after the durability test: less than 90°
Batch no. 16 (invention): receding angle after the durability test: 95°
Batch no. 17 (invention): receding angle after the durability test: 97.5°

The invention claimed is:

1. A process for manufacturing an optical article fit for edging, comprising an antifouling layer on which is deposited a temporary top coat that facilitates edging, comprising:
   (a) the deposition, on an optical substrate, of a single organic antifouling layer comprising at least one fluoropolymer compound comprising hydrolyzable functions; and
   (b) the deposition, on the antifouling layer, of a top coat that facilitates edging, of mineral nature, comprising one or more metal fluorides and/or one or more metal oxides or hydroxides;
the process further comprising, after the deposition of the antifouling layer and prior to the deposition of the top coat that facilitates edging, a step of accelerated grafting of the antifouling layer selected from:
   (a) a treatment in a wet atmosphere of the antifouling layer;
   (b) a catalytic treatment in acidic or basic vapor phase of the deposited antifouling layer.

2. The process of claim 1, wherein the accelerated grafting treatment is a treatment in a wet atmosphere that is carried out in an air atmosphere at atmospheric pressure.

3. The process of claim 2, wherein the treatment in an air atmosphere at atmospheric pressure is carried out at a degree of relative humidity of from 45% to 95% and a temperature of from 15° C. to 75° C.

4. The process of claim 2, wherein the duration of the air atmosphere treatment is from 1 to 7 days.

5. The process of claim 4, wherein the duration of the air atmosphere treatment is from 3 to 5 days.

6. The process of claim 1, wherein the depositions of the antifouling layer and of the top coat that facilitates edging are carried out under vacuum and the step of accelerated grafting of the antifouling layer is a treatment in a wet atmosphere of the antifouling layer carried out by a step of returning to an air atmosphere at atmospheric pressure between the deposition of the antifouling layer and the deposition of the top coat that facilitates edging.

7. The process of claim 1, wherein the depositions of the antifouling layer and of the top coat that facilitates edging are carried out under vacuum in a vacuum chamber and the step of accelerated grafting of the antifouling layer is a treatment in a wet atmosphere of the antifouling layer carried out by release of water into the vacuum chamber, without a step of returning to atmospheric pressure between the deposition of the antifouling layer and the deposition of the top coat that facilitates edging.

8. The process of claim 7, wherein the vacuum chamber comprises a cryogenic trap and the release of water is carried out by de-icing said cryogenic trap.

9. The process of claim 1, wherein the hydrolyzable functions are alkoxysilane functions.

10. The process of claim 1, wherein the hydrolyzable functions are present at only one end of the chain of the fluoropolymer compound.

11. The process of claim 1, wherein the acid or basic vapor phase is air saturated with HCl or $NH_3$ with its liquid phase in aqueous solution at atmospheric pressure and at ambient temperature (18-25° C.).

12. The process of claim 11, wherein the acidic aqueous solution is a 37% saturated HCl aqueous solution.

13. The process of claim 1, wherein the temporary top coat consists of a metal fluoride.

14. The process of claim 13, wherein the temporary top coat consists of $MgF_2$.

* * * * *

UNITED STATES PATENT AND TRADEMARK OFFICE
CERTIFICATE OF CORRECTION

PATENT NO. : 10,830,925 B2  
APPLICATION NO. : 15/501605  
DATED : November 10, 2020  
INVENTOR(S) : Grégory Hervieu et al.

It is certified that error appears in the above-identified patent and that said Letters Patent is hereby corrected as shown below:

On the Title Page

Item (54) and in the Specification at Column 1, Line 3, Title: delete "OR AND OPTICAL" and replace with -- OF AN OPTICAL --.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*